H. F. BARNETT & W. CARPENTER.
ANIMAL-TRAP.
No. 174,405. Patented March 7, 1876.
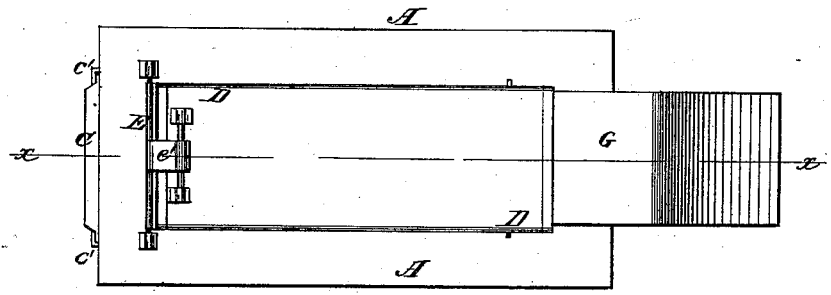
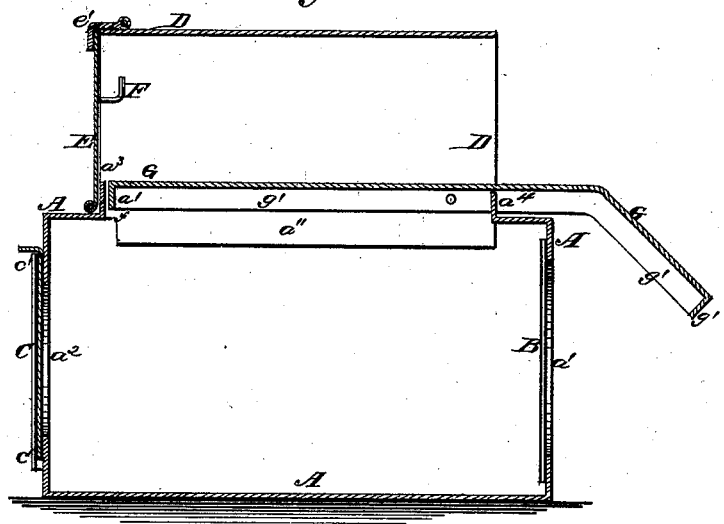
WITNESSES:
INVENTOR:

UNITED STATES PATENT OFFICE.

HENRY F. BARNETT AND WILLIAM CARPENTER, OF WESTON, MISSOURI.

IMPROVEMENT IN ANIMAL-TRAPS.

Specification forming part of Letters Patent No. 174,405, dated March 7, 1876; application filed January 15, 1876.

*To all whom it may concern:*

Be it known that we, HENRY FRANCIS BARNETT and WILLIAM CARPENTER, of Weston, in the county of Platte and State of Missouri, have invented a new and useful Improvement in Animal-Traps, of which the following is a specification:

Figure 1 is a top view of our improved animal-trap. Fig. 2 is a vertical longitudinal section of the same, taken through the line $x\,x$, Fig. 1.

Similar letters of reference indicate corresponding parts.

The object of this invention is to furnish an improved animal-trap, simple in construction and effective in use, and which shall be so constructed that, as each animal is caught, the trap will set itself ready to catch another.

The invention consists in the combination, with each other, of the lower box, provided with the openings in its ends and top, and with the wires, the door, and the flanges, the decoy-box provided with a door having a bait-hook attached to it, and the tilting-platform provided with the flange and having its outer part bent downward, as hereinafter fully described.

A is the lower or main box of the trap, which is made rectangular in form and of any desired size, according to the size of the animal trapped for. In the front end of the trap is formed an opening, $a^1$, to allow light to enter the said box A. The opening $a^1$ is guarded by wires B, crossing it and secured to the said box A, so that the animals cannot get out through it. In the other end of the box A is formed an opening, $a^2$, which is closed by a door, C, the side edges of which slide in grooves in cleats $c'$, attached to the end of the box A, so that, by removing or raising the said door C, the animals can be readily removed from the said box. In the top of the box A is formed a large opening of the same shape as the box, but smaller, so as to leave a passage-way for the animals upon the top of the box, all around the said opening. At the ends of the opening in the top of the box A are formed upwardly-projecting flanges $a^3$ $a^4$, and at the sides of said opening are formed downwardly-projecting flanges $a^2$. To the top of the box A, around the opening in said top, is secured the decoy-box D, which is also made rectangular in form. The front end of the decoy-box D is left open, and its back end is closed by the door E, which is hinged at its lower edge to the top of the box A, and its upper edge is secured by a catch, $e'$, attached to the top of the decoy-box D. To the inner side of the door E is attached a hook, F, to receive the bait.

G is a tilting platform, which is made of such a length as to close the opening in the top of the box A and project beyond the front end of said box. The platform or door G is pivoted, a little back of its center, to the forward lower part of the sides of the decoy-box D, so that the outer end may overbalance the inner end, and may raise the door into a horizontal position after its back end has been depressed.

The outer part of the door G is bent or inclined downward, as shown in Figs. 1 and 2, to cause it to return more quickly to a horizontal position after its back end has been depressed.

The edges of the door G are bent downward to form flanges $g'$, to make the door fit more closely and work more smoothly in the opening in the top of the box A.

The door G is held in a horizontal position by its outer part resting upon the top of the front part of the box A.

The operation is as follows: The animal sees the bait upon the hook F through the open front end of the decoy-box D, and, approaching it, he enters the said box, walking upon the tilting platform G. His weight causes the back end of the platform or door G to descend, and he is precipitated into the box A, whence he cannot escape.

The door G returns to a horizontal position as soon as its back end is released from the weight of the animal, and the trap is reset.

Having thus described our invention, we claim as new and desire to secure by Letters Patent—

The improved animal-trap, consisting of the box A, provided with the openings in its ends and top, and with the wires B, door C $c'$, and flanges $a^3\,a^4$, in combination with the decoy-box D, provided with the door E, having a bait-hook, F, attached to it, and the tilting door G, provided with the flange $g'$, and having its outer part bent downward, substantially as herein shown and described.

HENRY FRANCIS BARNETT.
WILLIAM CARPENTER.

Witnesses:
HARRY HOWARD,
JNO. T. REYNOLDS.